United States Patent
Matacotta et al.

(10) Patent No.: US 6,379,638 B1
(45) Date of Patent: Apr. 30, 2002

(54) METHOD FOR REMOVING HARMFUL COMPONENTS FROM A GASEOUS MIXTURE

(75) Inventors: Francesco Cino Matacotta, Trieste; Gianluca Calestani, Parma, both of (IT)

(73) Assignees: Consiglio Nazionale delle Ricerche, Rome; Universita' Degli Studi di Bologna, Bologna, both of (IT)

( * ) Notice: Subject to any disclaimer, the term of this patent is extended or adjusted under 35 U.S.C. 154(b) by 0 days.

(21) Appl. No.: 09/117,392

(22) PCT Filed: Feb. 10, 1997

(86) PCT No.: PCT/EP97/00598

§ 371 Date: Jul. 29, 1998

§ 102(e) Date: Jul. 29, 1998

(87) PCT Pub. No.: WO97/28884

PCT Pub. Date: Aug. 14, 1997

(30) Foreign Application Priority Data

Feb. 12, 1996 (IT) ............................. BO96A0063

(51) Int. Cl.$^7$ ............................ B01D 53/02; C01G 1/02
(52) U.S. Cl. ................. 423/210; 423/220; 423/230; 423/235; 423/239.1; 423/240 S; 423/241; 423/244.1; 423/246; 423/247; 423/593
(58) Field of Search ................. 423/593, 594, 423/595, 596, 598, 599, 600, 235, 239.1, 240 R, 241, 240 S, 244.01, 246, 247, 210, 220, 230

(56) References Cited

U.S. PATENT DOCUMENTS

| | | | |
|---|---|---|---|
| 4,221,768 A | * 9/1980 | Inoue et al. ............... 423/239 |
| 4,242,213 A | 12/1980 | Tamura et al. ............. 501/136 |
| 4,859,648 A | 8/1989 | Landis et al. ............... 502/242 |
| 5,055,512 A | 10/1991 | Kauffman et al. .......... 524/413 |
| 5,140,300 A | * 8/1992 | Ohno et al. ................. 338/325 |
| 5,238,913 A | 8/1993 | Coppa ........................ 505/413 |
| 5,240,646 A | * 8/1993 | Gillet et al. ................ 423/608 |
| 5,284,016 A | * 2/1994 | Starte et al. ............... 431/353 |
| 5,543,124 A | * 8/1996 | Yokota et al. ............. 423/239.1 |
| 5,658,693 A | * 8/1997 | Thacheray et al. ......... 523/599 |
| 5,874,057 A | * 2/1999 | Deeba et al. .............. 423/239.1 |
| 5,879,645 A | * 3/1999 | Park et al. ................. 423/239.1 |
| 6,153,161 A | * 11/2000 | Fetzer et al. .............. 423/239.1 |

FOREIGN PATENT DOCUMENTS

JP 64-30648 * 2/1989

OTHER PUBLICATIONS

Chemical Abstract 114:218577n Applications of extended x–ray . . . yttrium Barium copper nickel oxide ($YBa_2Cu_{3-x}Ni_xO_{7-y}$), 1991 (no month).*

Fujihara et al, "An orthorhombic $NdBa_{1.5}Sr_{0.5}Cu_3 O_{7-\delta}$ superconductor prepared using a a $Ba_{1.5}Sr_{0.5}Cu_3O_{5+x}$ precursor", Physica C 288, 158–162, 1997 (no month).*

Chemical Abstract 114:10885d, "Structural Characterization of copper–rich barium copper oxides", Thompson et al, Jan. 1991.*

* cited by examiner

Primary Examiner—Ngoc-Yen Nguyen
(74) Attorney, Agent, or Firm—Guido Modiano; Albert Josif; Daniel O'Byrne

(57) ABSTRACT

Compounds having the formula $$A_2B_3O_{6\pm d}$$

wherein A is an alkaline-earth metal, an alkaline metal, a lanthanide, or a solid solution thereof, B is a transition metal, an element of group III, or a solid solution thereof, and d has a value between 0 and 1; a method for preparing the compounds; a method for producing composite materials on various matrices and thin or thick films deposited on various substrates which contain the compounds; their use; and a method for eliminating certain gases from a mixture that includes them by using the compounds.

15 Claims, 4 Drawing Sheets

METHOD FOR REMOVING HARMFUL COMPONENTS FROM A GASEOUS MIXTURE

BACKGROUND OF THE INVENTION

The present invention relates to a new class of compounds having a gas-fixing activity, to a method for preparing said compounds, to methods for producing composite materials on various matrices and thin or thick films deposited on various substrates and containing said compounds, and to their use, as well as to a method for eliminating certain gases from a mixture that comprises them by using said compounds.

Various classes of materials with gas-fixing capabilities are currently known. They can be divided into two categories, depending on whether a) the fixing properties depend on actual chemical reactions, which entail the decomposition of the fixing material or b) the fixing properties depend on the adsorption characteristics at the physical surface of the fixer and, in general, on the size of the molecules to be fixed. Some typical examples of type a) materials are compounds capable of eliminating water vapor from a mixture of gases, for example calcium sulfate, phosphorus pentoxide, magnesium chloride, or carbon dioxide from a mixture of gases, for example sodium and potassium hydroxides and calcium, strontium, and barium oxides. Classic examples of type b) fixing materials are materials having an activated surface, such as activated charcoal or the various types of zeolite or some kinds of clay.

The fixing properties of type a) materials are selective, in that a compound is capable of fixing a single type of gas. The range of usable spontaneous reactions is rather limited and does not include gases which are highly harmful to the health and to the environment, such as nitrogen monoxide NO and carbon monoxide CO. Moreover, the involved reactions may be irreversible, so that the fixer loses all activity after a given utilization cycle.

On the other hand, type b) materials are not selective and fix gas molecules according to their size, degree of polarity, and relative molecular mass. These materials are unable to fix light molecules, such as the combustion products that are most harmful to the health and to the environment, such as mixtures of nitrogen oxides NO and $NO_2$ and carbon oxides, particularly the monoxide CO.

SUMMARY OF THE INVENTION

A principal aim of the present invention is to eliminate the drawbacks of conventional materials having gas-fixing capabilities, with particular interest for the removal of noxious components from combustion products and more generally from gas mixtures.

This aim as well as other objects which will become apparent from the following detailed description of the invention are achieved by a class of compounds according to the invention, which is represented by a compound having the formula $A_2B_3O_{6\pm d}$, wherein A is an alkaline-earth metal, an alkaline metal, a lanthanide or a solid solution thereof; B is a transition metal, an element of group III, or a solid solution thereof; and d has a value between 0 and 1.

Advantageously, A is chosen from the group constituted by barium, cesium, potassium, strontium, a lanthanide, or solid solutions thereof.

Conveniently, B is chosen from the group constituted by copper, nickel, manganese, iron, palladium, titanium, aluminum, gallium, zinc, cobalt, or solid solutions thereof.

DESCRIPTION OF THE PREFERRED EMBODIMENTS

Examples of compounds according to the invention, wherein A is a solid solution of the above-mentioned cations, are those having the formula $(Ba_{2-x}Sr_x)Cu_3O_6$ produced with values of x up to 0.75.

Other examples of compounds according to the invention, wherein B is a solid solution of the above-mentioned cations, have the formula $Ba_2(Cu_{3-y}Pd_y)O_d$ produced with y up to 0.33;

$Ba_2(Cu_{3-y}Ni_y)O_d$ produced with y up to 1.0.

A compound having the formula $Ba_2Cu_3O_{5+x}$ has been identified and partially described in the literature (see for example W. Wong-Ng and L. P. Cook, Powder Diffraction, 9 (1994), p. 280–289 and the references listed therein). However, the researchers who preceded the inventors of the present invention did not realize that they were in the presence of a new class of compounds having particular chemical activity characteristics.

In the compounds of the class to which this description relates, several phenomena which are intermediate between the behavior observed in type a) and type b) fixing compounds have been observed for the first time. The fixed gas molecules in fact react with the fixing material, in that they are truly bonded to the structure of the solid in the form of anions, as in type a) materials. However, the chemical reaction, within wide limits in terms of fixed gas amount, does not produce the decomposition of the fixing compound, the structural characteristics whereof vary to a very limited extent and in any case continuously and reversibly as a function of the amount of gas removed from the reaction atmosphere, similarly to the behavior observed in type b) fixers. Moreover, the fixing properties of the compounds according to the invention are not selective as in type a) materials and occur with a relatively wide variety of gases, such as gaseous halogens and oxides.

Figure 1:
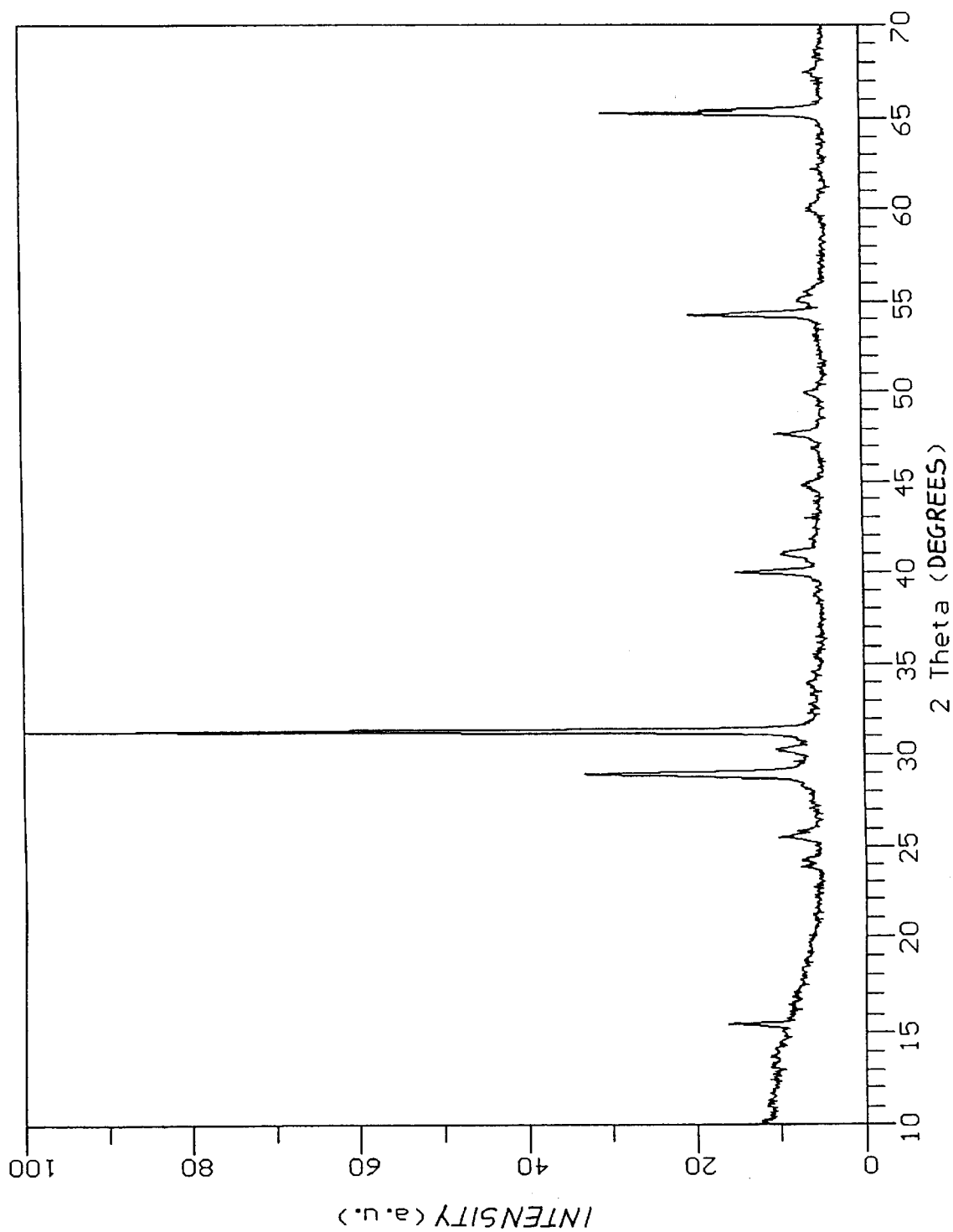
FIG. 1 is an X-ray diffraction profile of $Ba_2Cu_3O_{O\pm d}$.

Compounds having the formula $A_2B_3O^{6\pm d}$ according to the present invention can be prepared by direct reaction starting from mixtures containing oxide, peroxide, and nitrate precursors. These compounds lead to a characteristic X-ray powder diffraction profile, a typical example whereof, related to a sample of $Ba_2Cu_3O_{6\pm d}$, is shown in FIG. 1 (CuKa radiation was used). The spectrum in the figure can be indexed on the basis of an orthorhombic cell with a=4.316(1), b=6.889(2), and c=11.442(3) Å; the cell parameters, however, undergo significant variations as a function of d.

The formation temperatures of the compounds according to the present invention are typically within the range of 300 to 950° C. The optimum values of course vary as a function of the cations being used.

The method for preparing the compounds having the formula $A_2B_3O_{6\pm d}$ according to the present invention comprises a stage for the heat treatment of mixtures of oxides, peroxides, or salts of the required cations in highly oxidizing conditions. For example, heating occurs in a controlled atmosphere that contains only oxygen, nitrogen, and inert gases.

Of course, the higher the content of oxidizing compounds (for example peroxides or nitrates) in the initial mixture, the lower the partial pressure of oxygen in the atmosphere required to prepare the chosen compound. Vice versa, the higher the pressure of the oxygen in the reaction atmosphere, the lesser the role of the oxidizing component in the mixture of precursors.

The compounds according to the present invention can be prepared as polycrystalline aggregates, as components in composite materials having various matrices, and in the form of thin or thick layers on various substrates.

Advantageously, the compounds according to the present invention can be prepared starting from a mixture comprising one or more oxygenated compounds of an alkaline or alkaline-earth metal and one or more oxides of transition metals or elements of group III.

Moreover, the compounds according to the present invention can be prepared starting from a mixture comprising one or more nitrates of an alkaline-earth or alkaline metal and one or more nitrates of transition metals or of elements of group III.

The following procedures illustrate the methods for preparing the compound $A_2B_3O_{6\pm d}$.

The following examples of a preparation method for the compounds according to the present invention are given only by way of non-limitative example.

In all the procedures presented hereafter, the cationic molar ratio for producing the indicated solutions and mixtures is given. For the sake of greater precision, the corresponding weight ratios are specified hereafter for each procedure.

Procedure A

A1) A mixture of fine powders of barium peroxide and copper oxide in a 2:3 molar ratio [0.704 grams of copper oxide (CuO) for every gram of barium peroxide ($BaO_2$)] is produced;

A2) The mixture is homogenized by milling with a mechanical mill or manually with a mortar and pestle of agate or with another method for dry mixing or for mixing in the presence of appropriate liquids;

A3) The homogenized mixture is placed in an inert refractory container (alumina or the like) and is heated in a furnace under a stream of oxygen and inert gas (the partial pressure of the oxygen is typically $\geq 0.2$ bar, 1 cc/sec) at 580÷650° C.

A4) The compound is kept at the same temperature for 12 hours.

A5) Steps A2, A3, and A4 are repeated until a compound is obtained which provides the X-ray diffraction pattern shown in FIG. 1, which characterizes the $Ba_2Cu_3O_{6\pm d}$ phase.

Procedure B

B1) A mixture of fine powders of barium nitrate and copper oxide in a 2:3 molar ratio [0.457 grams of copper oxide (CuO) for every gram of barium nitrate ($Ba(NO_3)_2$)] is produced;

B2) Same as A2.

B3) Same as A3.

B4) The compound is kept at the same temperature until the solution of $NO_2$ gas generated by the decomposition of the nitrate salts is depleted. At the end of the process, the compound is obtained which gives the X-ray diffraction pattern shown in FIG. 1, which characterizes the $Ba_2CU_3O_{6\pm d}$ phase.

B5) With this procedure, the dimensions of the resulting granules are in the millimeter range and allow the use of single-crystal characterization techniques.

Procedure C

C1) A mixture of fine powders of barium nitrate and copper nitrate in a 2:3 molar ratio [1.335 grams of hemipentahydrate copper nitrate ($Cu(NO_3)_2+2.5_2O$) or 1.077 grams of anhydrous copper nitrate ($Cu(NO_3)_2$) for every gram of barium nitrate] is produced;

C2) Same as A2.

C3) Same as A3.

C4) Same as B4.

C5) Same as B5.

Procedure D

D1) A mixture of fine powders of barium oxide and copper oxide in a 2:3 molar ratio [0.778 grams of copper oxide (CuO) for every gram of barium oxide (BaO)] is produced;

D2) Same as A2;

D3) The homogenized mixture is placed in an inert refractory container (alumina or the like) and is heated in a pressurized furnace with a partial oxygen pressure in excess of 1 bar at 580÷650° C.;

D4) Same as A4;

D5) Steps D2, D3, and D4 are repeated until a compound is obtained which has the X-ray diffraction pattern shown in FIG. 1, which characterizes the $Ba_2Cu_3O_{6\pm d}$ phase.

Procedure E

E1) A solution of barium nitrate and copper nitrate in a 2:3 molar ratio is prepared in distilled water up to the solubility limit for barium nitrate [1.335 grams of hemipentahydrate copper nitrate ($Cu(NO_3)_2+2.5_2O$) or 1.077 grams of anhydrous copper nitrate ($Cu(NO_3)_2$) for every gram of barium nitrate];

E2) An inert, temperature-resistant, porous medium (for example neutral activated Brockman alumina) is impregnated with the solution thus prepared;

E3) The water is eliminated with a drying treatment at 150° C. for 2 hours.

E4) Same as B4, but the reflections of the porous substrate, if crystalline, are also found in the X-ray diffractogram.

E5) The final product is a composite material wherein the compound $Ba_2Cu_3O_6\pm d$ fills the microcavities of the porous substrate.

Procedure F.

F1) Same as E1;

F2) The solution is used to wet the surface of a substrate of temperature-resistant, non-porous, inert material, constituted by polycrystalline $Al_2O_3$ with a relative density of 99.9% (other examples of usable non-porous inert materials are quartz, porcelain, Inconel, oxidation-resistant alloys and metals, etcetera);

F3) The deposited water is quickly evaporated by electrical heating to approximately 230° C.;

F4) Steps F2 and F3 are repeated until a thin deposition of nitrates of the desired thickness, for example approximately 10 µ, is obtained;

F5) Same as B4.

F6) The final product is a film of $Ba_2Cu_3O_{6\pm d}$ having a presettable thickness.

In another aspect, the present invention relates to a method for eliminating certain gases from a gaseous mixture including them. The ability of the compounds according to the present invention to fix molecules of various gases directly from the gaseous state has been verified by direct measurements, such as thermogravimetry, analysis of the gases in the reaction atmosphere, or by indirect measurements, such as Raman and infrared spectroscopy. The compounds according to the present invention are particularly adapted for fixing oxides and halogens in the gaseous phase.

Examples of such gases are $NO_2$, $CO_2$, $SO_2$, NO, CO, $F_2$, and $Cl_2$.

The way of fixing the gas depends on the type of gas and on the temperature and composition of the atmosphere in which the reaction occurs.

The inventors of the present invention have observed for the first time in the compounds of the class to which the present invention relates fixing phenomena which are intermediate between the behavior observed in conventional fixing compounds of types a) and b) described above. The gas molecules are in fact fixed by reacting chemically with the fixing material, in that they are bonded to the structure of the solid in the form of anions. However, the chemical reactions related to the fixing processes, although continuously modifying the composition of the fixer, do not cause, over a broad range in terms of amount of fixed gas, the destruction of the structure of the fixing solid, the structural parameters whereof vary to a very small extent and in any case continuously as a function of the amount of gas removed from the reaction atmosphere. If the process is continued beyond these limits, absorption can continue but it entails the destruction of the fixer structure and the formation of oxides or of the salts corresponding to the anions that form.

The gases fixed by means of the mechanisms that are active in the first stages of the process, regardless of their nature, enter the compounds according to the invention in the form of oxyanions or halide ions. The structural characteristics of the fixing compounds vary continuously during this first part of the process, in the same way in which the structural characteristics of a solid solution vary as one of its components varies. During this stage, the fixing process is reversible for many of the fixable gases; by varying the partial pressures and the temperature it is possible to desorb them fully or partially. Gaseous oxides with a low oxidation state (NO and CO, for example) can be desorbed in a higher oxidation state ($NO_2$ and $CO_2$, for example) if the atmosphere in which release occurs is sufficiently oxidizing. Once a first limit concentration of oxyanions or halides, which depends on the type of gas and on the temperature, has been reached, reversibility is lost except in the case of nitrogen oxides. In this particular case, reversibility of the fixing process is complete, since the final product corresponds to the initial material for the production of the compounds at issue, as described in preparation procedure B) or C), depending on whether the process occurs above or below the temperature at which the copper nitrate decomposes to copper oxide.

The chemical reactions related to the fixing processes occur by virtue of the presence of an excess of oxygen in the structure. By way of example, in the case of the compound in which A=Ba and B=Cu, the oxygen composition produced by the normal state of oxidation of the cations ($Ba^{2+}$ and $Cu^{2+}$) would be 5 atoms per unit of the formula ($Ba_2Cu_3O_5$), whilst accurate determinations of the oxygen content in samples prepared according to the previously described procedures show an oxygen content that is typically in the range of 5.5 to 6.1 atoms per unit of the formula. Accordingly, the fixing processes do not require the addition of external oxygen; however, their yield is increased by the presence of oxygen in the gas mixtures placed in contact with the fixing materials.

The method according to the present invention for eliminating certain gases from a gaseous mixture that includes them consists in placing the gas mixture in contact with a compound having the formula $A_2B_3O_{6\pm d}$ in pure form or as a component of composite materials, in which A is an alkaline-earth metal, an alkaline metal, a lanthanide, or a solid solution thereof; B is a transition metal, an element of group III, or a solid solution thereof; and d has a value between 0 and 1, at a temperature between the melting temperature of the compound to be fixed and 650° C. Preferably, A is chosen from the group constituted by barium, cesium, potassium, strontium, or solid solutions thereof, and B is chosen from the group constituted by copper, nickel, manganese, iron, palladium, titanium, aluminum, gallium, zinc, cobalt, or solid solutions thereof. The method is described in greater detail hereinafter with two examples referring to situations that produce different yields:

1) fixing of $NO_2$ at room temperature from an oxygen-containing atmosphere;

2) hot fixing of NO from an oxygen-free atmosphere.

The following examples of gas fixing methods using compounds according to the present invention are given merely by way of non-limitative example.

EXAMPLE 1

Figure 2:
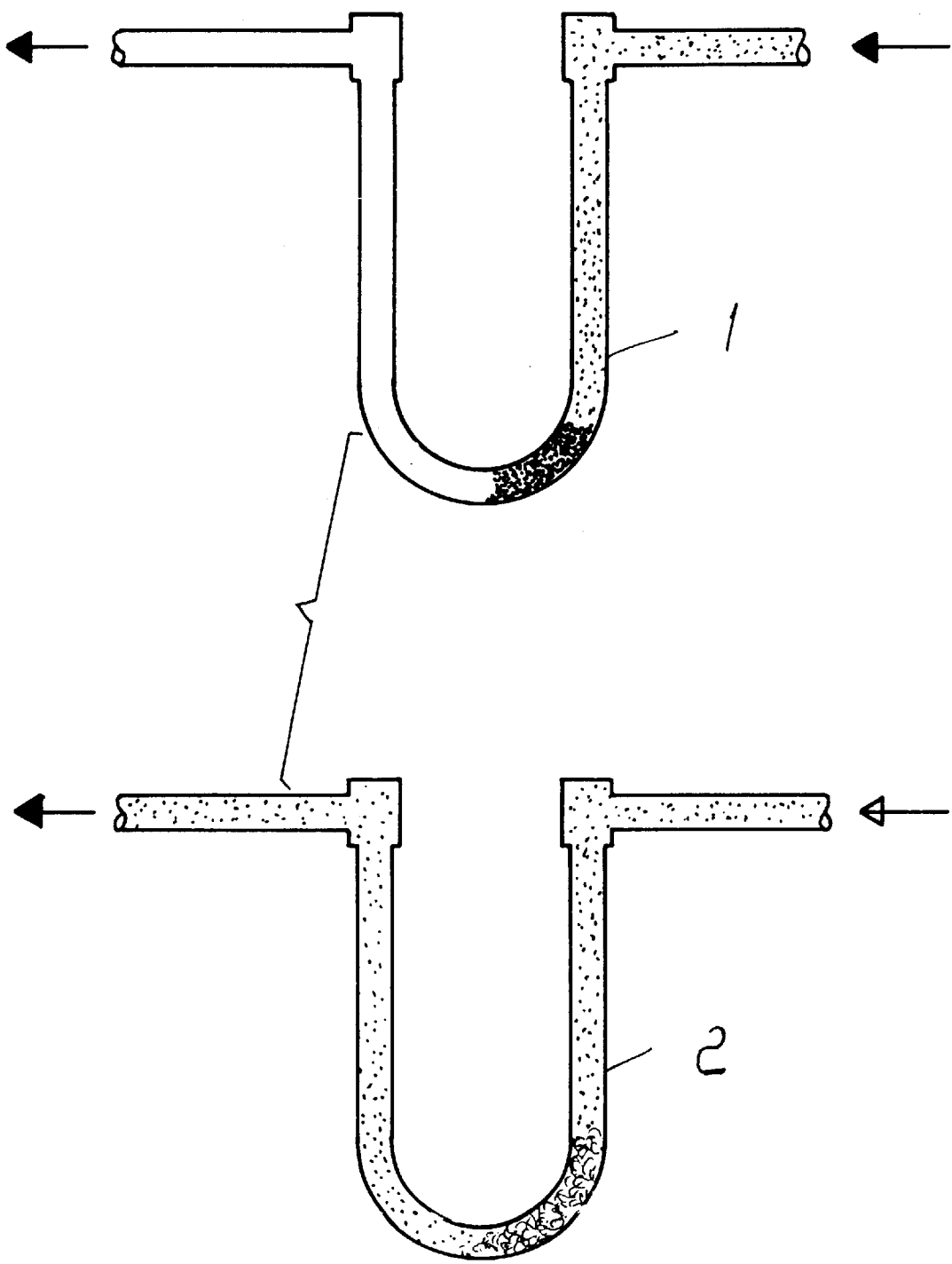
FIG. 2 shows the U-shaped tubes used for removing the harmful components from a gas mixture.

$NO_2$ Fixing 3 grams of $Ba_2Cu_3O_{6\pm d}$ produced according to procedure B) are placed in a U-shaped tube wherein a stream of $NO_2$ (50%) and air is made to flow (90 cc/min flow, 20° C. temperature). The gas fixing activity is clearly shown in FIG. 2, which shows a first U-shaped tube (1) and a second U-shaped tube (2) which are parallel-connected with respect to the stream of $NO_2$ and air; a layer of $Ba_2Cu_3O_{6\pm d}$ is present in the base of tube (1), whilst a layer of white material (for example cotton) is present in the base of tube (2). It is observed that in tube (1) the gas changes color from orange (represented by stippling) to colorless as a consequence of its passage through the layer of $Ba_2Cu_3O_{6\pm d}$, whilst in tube (2) it remains of the same orange color after passing through the white layer. In these conditions, the fixing activity persists for approximately 300 minutes. At the end of the process, a weight increase was found which corresponded, within the measurement errors (5%), to the total conversion of the initial compound into copper and barium nitrate salts and to the fixing of 10 moles of gas per mole of fixer.

EXAMPLE 2

NO Fixing

Figure 3:
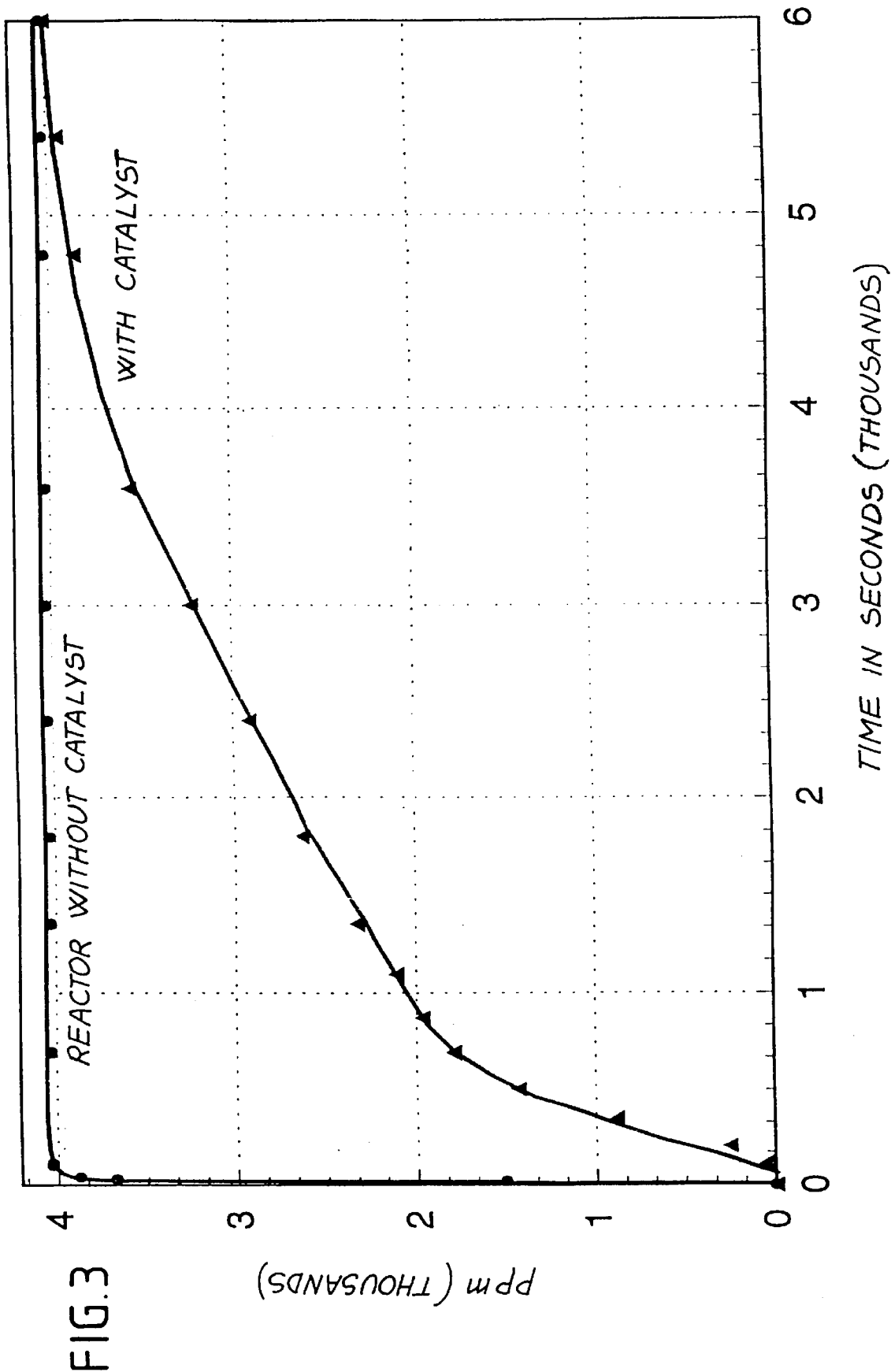
FIG. 3 shows the result of an NO concentration analysis by mass spectrometry on two gas streams.

FIG. 3 shows the result of an NO concentration analysis by mass spectrometry on two gas streams (112 cc/min) originating from a common source of a mixture of He+0.4% NO, one of which passes through a reactor brought to 350° C. which contains 1 gram of $Ba_2Cu_3O_{6\pm d}$ compound produced according to procedure A). This measurement points out different fixing processes with separate kinetics. The amount of gas fixed at saturation (2 hours) is 0.28 moles per mole of fixer.

Figure 4:
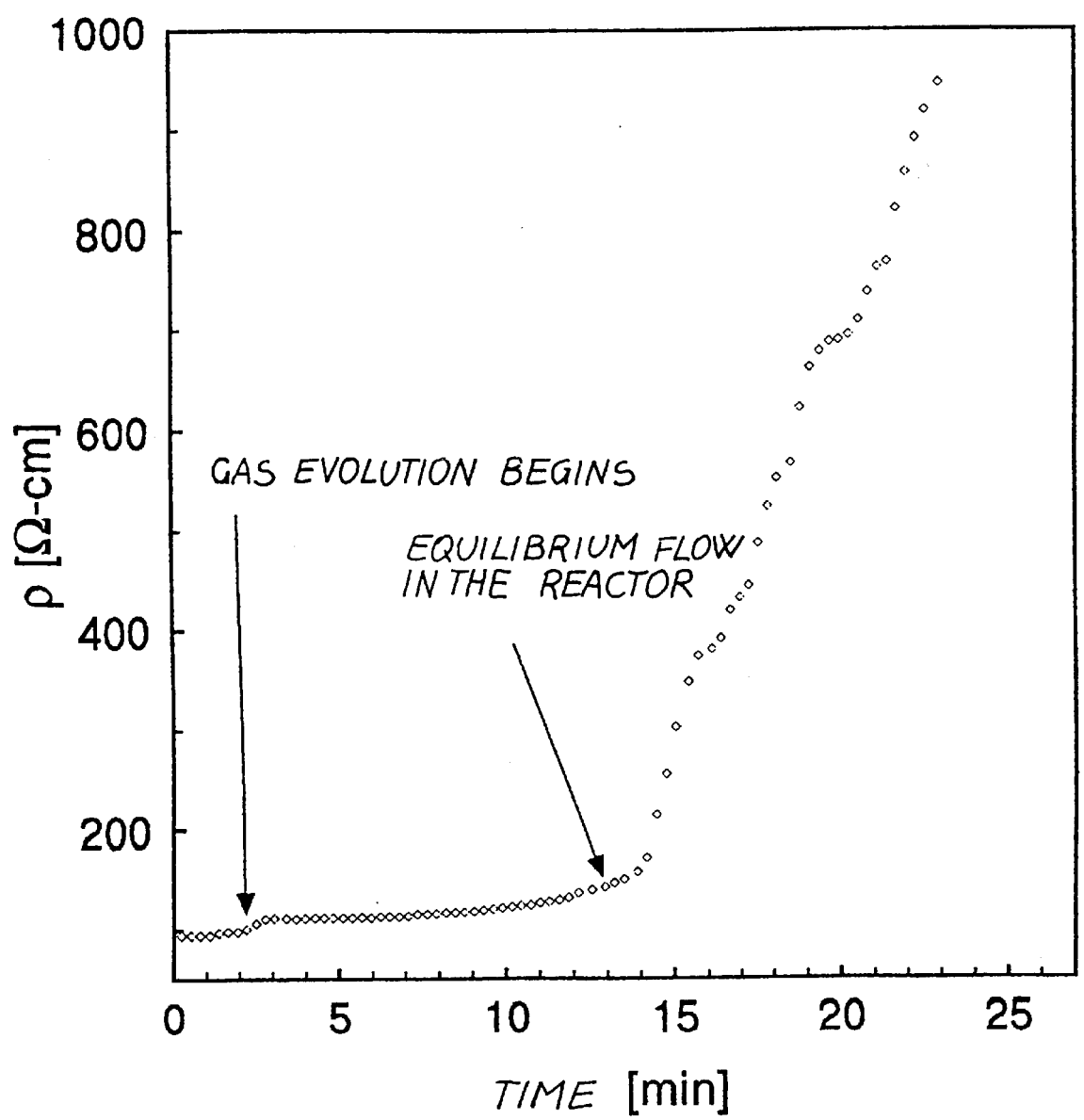
FIG. 4 shows the electrical resistance of a film produced according to procedure E) as stated below and exposed to a stream of $NO_2$ (50%) and air at room temperature.

Another aspect of the present invention relates to an electric sensor for gas concentration, which comprises a compound having the formula $A_2B_3O_{6\pm d}$. The inventors have in fact found that for the compounds according to the present invention, during the gas fixing process, the value of electrical resistivity increases in proportion to the amount of gas that is incorporated. For example, the compound $Ba_2Cu_3O_{6\pm d}$ is a semiconductor with typical values of electrical resistance at room temperature on the order of 10–100 ohm/cm. In the case of the fixing of nitrogen or carbon oxides, this value is up to 4 orders of magnitude higher. FIG. 4 plots the electrical resistance of a film produced according to procedure E) and exposed to a stream of $NO_2$ (50%) and air at room temperature.

Moreover, in another aspect the present invention relates to optical gas concentration sensors which comprise a compound having the formula $A_2B_3O_{6\pm d}$.

The inventors of the present invention have found that the compounds having the formula $A_2B_3{}_6O_{6\pm d}$ show considerable variations in their optical properties during the gas incorporation process. These variations become apparent as variations in the intensities of the characteristic modes in infrared and Raman spectra, with the appearance of new optical modes caused by the characteristic vibrations of the incorporated anions and with the appearance of characteristics which cannot be ascribed to the initial material or to the guest anions, such as for example a plurality of highly intense luminescence peaks which appear as a consequence of the incorporation of small amounts of carbon oxides. In addition to the variations in the measured spectra, macroscopic changes in color are observed as a consequence of the incorporation of small amounts of carbon oxides. For example, the color of the $Ba_2Cu_3O_{6\pm d}$ changes from the initial dark blue to black, whilst a color change is observed towards greenish pale blue as a consequence of the incorporation of large amounts of nitrogen oxides below 170° C.

What is claimed is:

1. A method for removing harmful components in a gaseous mixture comprising the step of contacting the gaseous mixture at room temperature with a compound having the formula $$A_2B_3O_{6\pm d}$$

wherein A is an alkaline-earth metal, an alkaline metal, a lanthanide, or a solid solution thereof, B is a transition metal, an element of group III, or a solid solution thereof, and d has a value between 0 and 1.

2. The method of claim 1, wherein A is chosen from the group constituted by barium, cesium, potassium, strontium, a lanthanide, or solid solutions thereof.

3. The method of claim 1, wherein B is chosen from the group constituted by copper, nickel, manganese, iron, palladium, titanium, aluminum, gallium, zinc, cobalt, or solid solutions thereof.

4. The method of claim 1, wherein said compound has the formula $Ba_2Cu_3O_{6\pm d}$.

5. The method of claim 1, wherein said compound has the formula $(Ba_{2-x}A_x)Cu_3O_{6\pm d}$ wherein A is an alkali metal, an alkaline-earth metal, or a lanthanide.

6. The method of claim 1, wherein said compound has the formula $(Ba_{2-x}Sr_x)Cu_3O_{6\pm d}$, $0<x<0.75$.

7. The method of claim 1, wherein said compound has the formula $Ba_2(Cu_{3-y}B_y)O_{6\pm d}$, $0<y<1$, wherein B is a transition metal or an element of group III.

8. The method of claim 2, wherein said compound has the formula $Ba_2(Cu_{3-y}Ni_y)O_{6\pm d}$, $0<y<1$.

9. The method of claim 1, wherein said compound has the formula $Ba_2(Cu_{3-y}Pd_y)O_{6\pm d}$, $0<y<0.33$.

10. The method of claim 1, wherein said components are selected from the group consisting of gaseous halogens and oxides.

11. The method of claim 1, wherein said components are chosen from the group constituted by NO, $NO_2$, $CO_2$, CO, $SO_2$, $F_2$, and $Cl_2$.

12. The method according to claim 11, comprising a subsequent step for the regeneration of said compound by heating to a temperature between 550 and 750° C.

13. The method according to claim 12, wherein said regeneration step occurs in an oxidizing atmosphere.

14. The method of claim 1 wherein the compound is in the form of a composite material comprising the compound.

15. The method of claim 1, wherein the compound is in the form of a film constituted by a material comprising the compound.

* * * * *